United States Patent
Lim et al.

(10) Patent No.: US 10,147,224 B2
(45) Date of Patent: Dec. 4, 2018

(54) METHOD AND APPARATUS FOR GENERATING OMNI MEDIA TEXTURE MAPPING METADATA

(71) Applicant: Samsung Electronics Co., Ltd, Suwon-si (KR)

(72) Inventors: Youngkwon Lim, Allen, TX (US); Madhukar Budagavi, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 13 days.

(21) Appl. No.: 15/431,587

(22) Filed: Feb. 13, 2017

(65) Prior Publication Data
US 2017/0236323 A1    Aug. 17, 2017

Related U.S. Application Data

(60) Provisional application No. 62/295,823, filed on Feb. 16, 2016.

(51) Int. Cl.
| | | |
|---|---|---|
| *G06T 15/00* | (2011.01) | |
| *G06T 15/04* | (2011.01) | |
| *G06T 7/62*  | (2017.01) | |

(52) U.S. Cl.
CPC .............. *G06T 15/04* (2013.01); *G06T 7/62* (2017.01); *G06T 2207/10016* (2013.01)

(58) Field of Classification Search
CPC .. G06T 15/04; G06T 7/62; G06T 2207/10016
USPC ....................................................... 345/419
See application file for complete search history.

(56) References Cited

U.S. PATENT DOCUMENTS

| | | | | |
|---|---|---|---|---|
| 8,493,408 | B2* | 7/2013 | Williamson | G01C 21/3647 340/988 |
| 8,902,226 | B2* | 12/2014 | Meadow | G06T 17/05 345/419 |
| 8,982,154 | B2* | 3/2015 | Vincent | G06T 17/05 345/419 |
| 9,271,025 | B2* | 2/2016 | McArdle | H04N 21/23412 |
| 9,692,965 | B2* | 6/2017 | Hayashi | G06T 11/60 |
| 9,736,371 | B2* | 8/2017 | Taneichi | H04N 5/23238 |
| 2002/0018065 | A1* | 2/2002 | Tobita | G06T 15/20 345/427 |
| 2003/0218606 | A1 | 11/2003 | Zhirkov et al. | |
| 2006/0268360 | A1 | 11/2006 | Jones | |

(Continued)

OTHER PUBLICATIONS

Roebert S, Schmits T, Visser A. Creating a bird-eye view map using an omnidirectional camera. InProceedings of the 20th Belgian-Netherlands Conference on Artificial Intelligence (BNAIC 2008) Oct. 2008 (pp. 233-240).*

(Continued)

*Primary Examiner* — Phu K Nguyen

(57) ABSTRACT

A video player for generating omni media texture mapping metadata is provided. The video player includes a memory and a processor connected to the memory. The processor is configured to receive, from a video processor, a signal indicating a shape of a geometric frame for a video and an area of interest on a planar frame. The processor is also configured to map the area of interest on the planar frame to a region of interest on the geometric frame based on the shape of the geometric frame. The processor is further configured to generate the geometric frame with the region of interest.

20 Claims, 8 Drawing Sheets

(56) References Cited

U.S. PATENT DOCUMENTS

| | | | | |
|---|---|---|---|---|
| 2007/0122058 A1* | 5/2007 | Kitaura | ................... | G06T 7/579 |
| | | | | 382/284 |
| 2008/0291217 A1* | 11/2008 | Vincent | ................... | G06T 17/05 |
| | | | | 345/629 |
| 2011/0273528 A1* | 11/2011 | Sazawa | ................... | G06T 15/20 |
| | | | | 348/36 |
| 2012/0307001 A1 | 12/2012 | Osako et al. | | |
| 2014/0132788 A1 | 5/2014 | Ramsay et al. | | |
| 2014/0218354 A1* | 8/2014 | Park | ..................... | G06T 3/4038 |
| | | | | 345/419 |
| 2015/0113581 A1 | 4/2015 | McArdle et al. | | |

OTHER PUBLICATIONS

Deng et al,Automatic Texture Mapping with an Omnidirectional Camera Mounted on a Vehicle Towards Large Scale 3d City Models, ISPRS—International Archives of the Photogrammetry, Remote Sensing and Spatial Information Sciences, vol. XXXIX-B1, 2012, pp. 355-360.*

Wong, Wai Kit, Wee ShenPua, Chu Kiong Loo, and Way Soong Lim. "A study of different unwarping methods for omnidirectional imaging." In Signal and Image Processing Applications (ICSIPA), 2011 IEEE International Conference on, pp. 433-438. IEEE, 2011.*

ISA/KR, "International Search Report," Application No. PCT/KR2017/001734, dated May 23, 2017, Korean Intellectual Patent Office, Daejeon, Korea, 3 pages.

ISA/KR, "Written Opinion of the International Searching Authority," Application No. PCT/KR2017/001734, dated May 23, 2017, Korean Intellectual Patent Office, Daejeon, Korea, 6 pages.

* cited by examiner

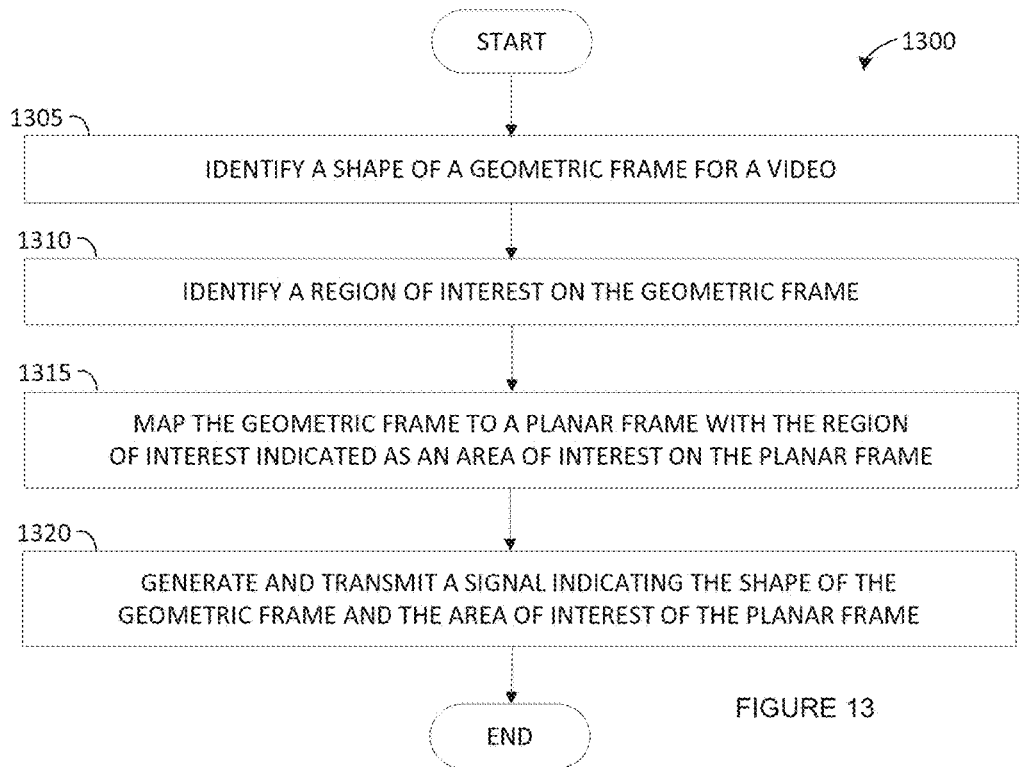

METHOD AND APPARATUS FOR GENERATING OMNI MEDIA TEXTURE MAPPING METADATA

CROSS-REFERENCE TO RELATED APPLICATION(S) AND CLAIM OF PRIORITY

This application claims priority under 35 U.S.C. § 119(e) to U.S. Provisional Patent Application No. 62/295,823 filed on Feb. 16, 2016, titled "OMNI MEDIA TEXTURE MAPPING METADATA". The above-identified provisional patent applications are hereby incorporated by reference in their entirety.

TECHNICAL FIELD

This disclosure relates generally to virtual reality mapping. More specifically, this disclosure relates to a method and apparatus for omni media texture mapping metadata.

BACKGROUND

VR media today uses a single rectangular video as a source of texture data to be mapped onto various 3D geometry types. To ensure interoperable rendering of VR contents on a player regardless of camera configuration and stitching methods, standardized metadata needs to be defined.

SUMMARY

This disclosure provides a method and apparatus for view-dependent tone mapping of virtual reality images.

In a first embodiment, a video processor for generating omni media texture mapping metadata is provided. The video processor includes a memory and a processor connected to the memory. The processor is configured to identify a shape of a geometric frame for a video and identify a region of interest on the geometric frame. The processor is also configured to map the geometric frame to a planar frame with the region of interest from the geometric frame indicated as an area of interest on the planar frame. The processor is further configured to generate a signal indicating the shape and the area of interest, and transmit, to a video player, the signal.

In a second embodiment, a video player for generating omni media texture mapping metadata is provided. The video player includes a memory and a processor connected to the memory. The processor is configured to receive, from a video processor, a signal indicating a shape of a geometric frame for a video and an area of interest on a planar frame. The processor is also configured to map the area of interest on the planar frame to a region of interest on the geometric frame based on the shape of the geometric frame. The processor is further configured to generate the geometric frame with the region of interest.

In a third embodiment, a method for a video player for generating omni media texture mapping metadata is provided. The method includes receiving, from a video processor, a signal indicating a shape of a geometric frame for a video and an area of interest on a planar frame. The method also includes mapping the area of interest on the planar frame to a region of interest on the geometric frame based on the shape of the geometric frame. The method for includes generating the geometric frame with the region of interest.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 13 illustrates an example process for omni media texture mapping metadata in a video processor according to an embodiment of this disclosure; and FIG. 14 illustrates an example process for omni media texture mapping metadata in a video player according to an embodiment of this disclosure.

DETAILED DESCRIPTION

FIGS. 1 through 14, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Figure 1:
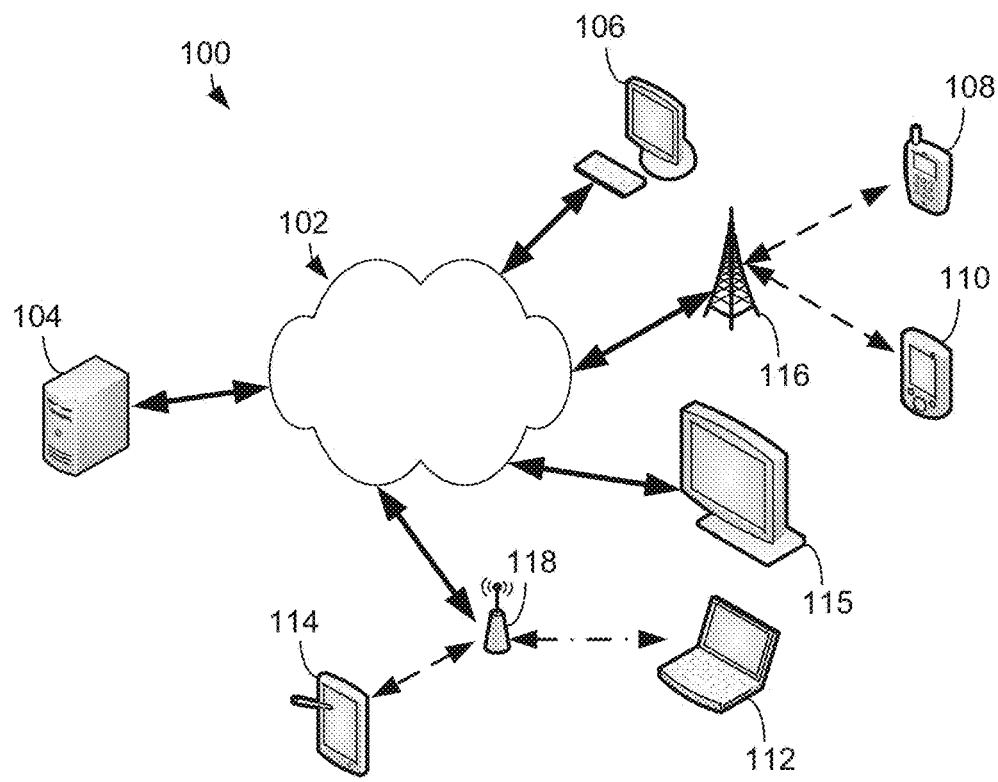
FIG. 1 illustrates an example computing system according to various embodiments of the present disclosure.

FIG. 1 illustrates an example computing system 100 according to this disclosure. The embodiment of the computing system 100 shown in FIG. 1 is for illustration only. Other embodiments of the computing system 100 could be used without departing from the scope of this disclosure.

As shown in FIG. 1, the system 100 includes a network 102, which facilitates communication between various components in the system 100. For example, the network 102 may communicate internet protocol (IP) packets, frame relay frames, asynchronous transfer mode (ATM) cells, or other information between network addresses. The network 102 may include one or more local area networks (LANs), metropolitan area networks (MANs), wide area networks (WANs), all or a portion of a global network such as the Internet, or any other communication system or systems at one or more locations.

The network 102 facilitates communications between at least one server 104 and various client devices 106-114. Each server 104 includes any suitable computing or processing device that can provide computing services for one or more client devices. Each server 104 could, for example, include one or more processing devices, one or more memories storing instructions and data, and one or more network interfaces facilitating communication over the network 102.

Each client device 106-114 represents any suitable computing or processing device that interacts with at least one server or other computing device(s) over the network 102. In this example, the client devices 106-114 include a desktop computer 106, a mobile telephone or smartphone 108, a personal digital assistant (PDA) 110, a laptop computer 112, and a tablet computer 114. However, any other or additional client devices could be used in the computing system 100.

In this example, some client devices 108-114 communicate indirectly with the network 102. For example, the client devices 108-110 communicate via one or more base stations 116, such as cellular base stations or eNodeBs. Also, the client devices 112-114 communicate via one or more wireless access points 118, such as IEEE 802.11 wireless access points. Note that these are for illustration only and that each client device could communicate directly with the network 102 or indirectly with the network 102 via any suitable intermediate device(s) or network(s).

In this illustrative embodiment, computing system 100 provides for generating omni media texture mapping metadata. For example, server 104 may represent a video processor that generates and provides a signal indicating a shape of a geometric frame and an area of interest of a planar frame and smartphone 108 may represent a video player that receives the signal in order to map a planar frame with an area of interest to a corresponding geometric frame with a region of interest.

Although FIG. 1 illustrates one example of a computing system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
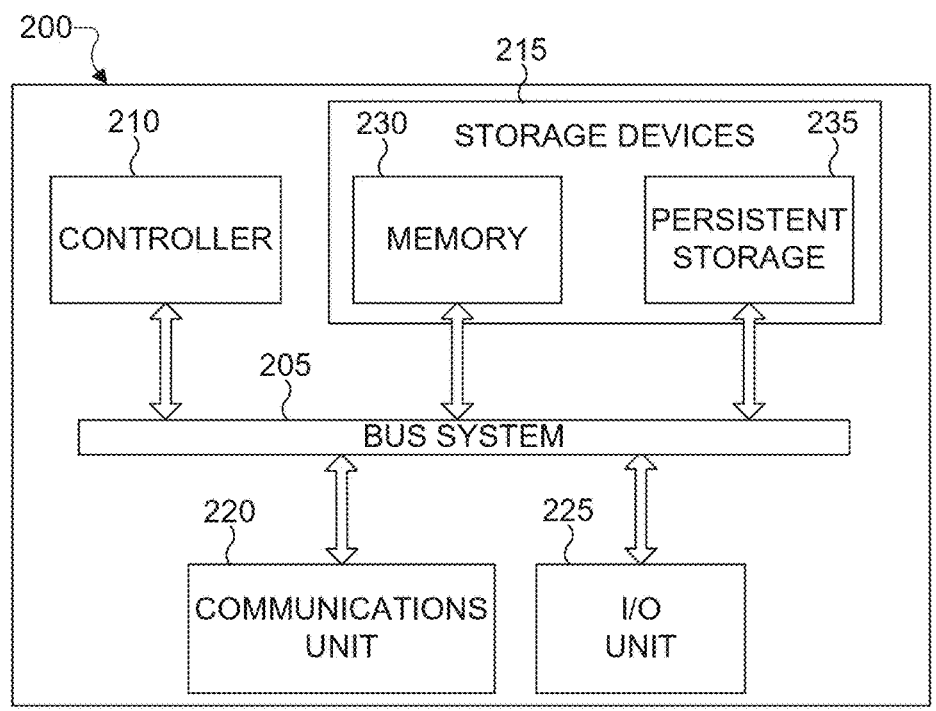
FIGS. 2 and 3 illustrate example devices in a computing system according to various embodiments of the present disclosure.
Figure 3:
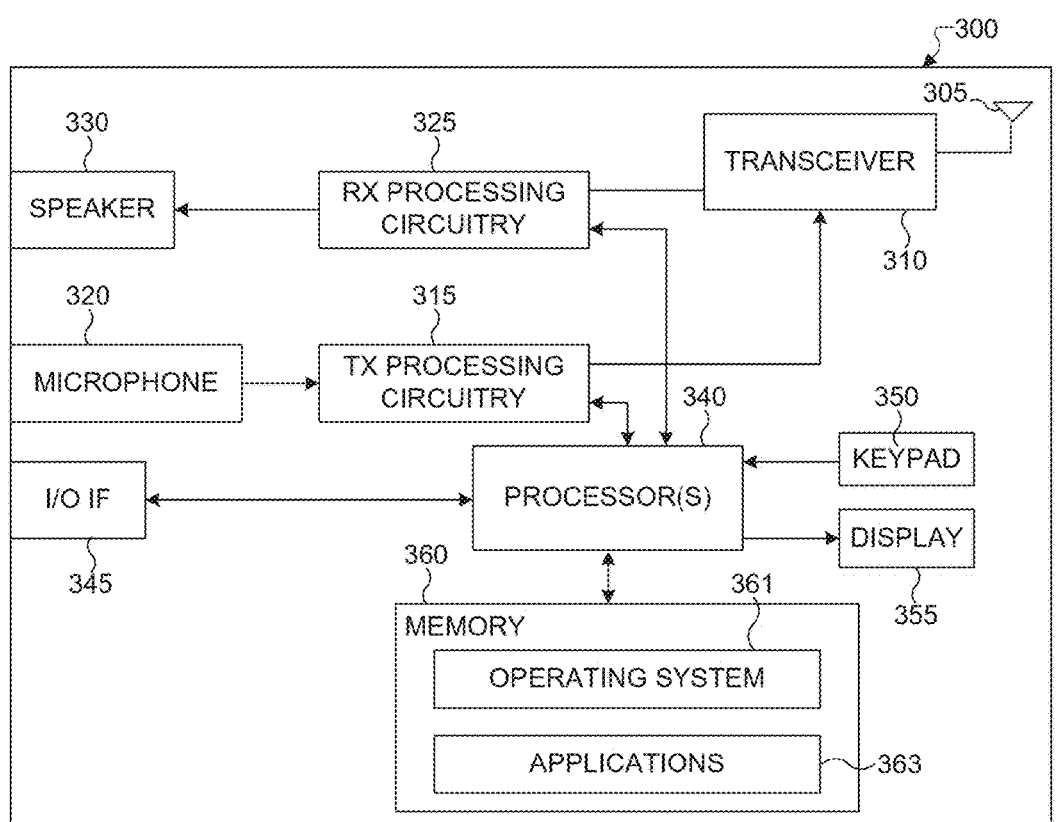

FIGS. 2 and 3 illustrate example devices in a computing system according to this disclosure. In particular, FIG. 2 illustrates an example server 200, and FIG. 3 illustrates an example client device 300. The server 200 could represent the server 104 in FIG. 1, and the client device 300 could represent one or more of the client devices 106-114 in FIG. 1.

As shown in FIG. 2, the server 200 includes a bus system 205, which supports communication between one or more processors 210, at least one storage device 215, at least one communications unit 220, and at least one input/output (I/O) unit 225.

The processor(s) 210 execute instructions that may be loaded into a memory 230, such as instructions for generating omni media texture mapping metadata. The processor(s) 210 may include any suitable number(s) and type(s) of processors or other devices in any suitable arrangement. Example types of processor(s) 210 include microprocessors, microcontrollers, digital signal processors, field programmable gate arrays, application specific integrated circuits, and discreet circuitry. The processor(s) 210 is configured to perform operations for unlocking an electronic device with an authenticated wearable device.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a ready only memory, hard drive, Flash memory, or optical disc.

The communications unit 220 supports communications with other systems or devices. For example, the communications unit 220 could include a network interface card or a wireless transceiver facilitating communications over the network 102. The communications unit 220 may support communications through any suitable physical or wireless communication link(s).

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

In this illustrative embodiment, server 200 may implement an apparatus that provides for generating omni media texture mapping metadata, as will be discussed in greater detail below. Note that while FIG. 2 is described as representing the server 104 of FIG. 1, the same or similar structure could be used in one or more of the client devices 106-114. For example, a laptop or desktop computer could have the same or similar structure as that shown in FIG. 2.

As shown in FIG. 3, the client device 300 includes an antenna 305, a radio frequency (RF) transceiver 310, transmit (TX) processing circuitry 315, a microphone 320, and receive (RX) processing circuitry 325. The client device 300 also includes a speaker 330, a one or more processors 340, an input/output (I/O) interface (IF) 345, a touchscreen 350, a display 355, and a memory 360. The memory 360 includes a basic operating system (OS) program 361 and one or more applications 362.

The RF transceiver 310 receives, from the antenna 305, an incoming RF signal transmitted by another component in a system. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor(s) 340 for further processing (such as for web browsing data).

The TX processing circuitry 315 receives analog or digital voice data from the microphone 320 or other outgoing baseband data (such as web data, e-mail, or interactive video game data) from the processor(s) 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor(s) 340 can include one or more processors or other processing devices and execute the basic OS program 361 stored in the memory 360 in order to control the overall operation of the client device 300. For example, the processor(s) 340 could control the reception of forward channel signals and the transmission of reverse channel signals by the RF transceiver 310, the RX processing circuitry 325, and the TX processing circuitry 315 in accordance with well-known principles. In some embodiments, the processor(s) 340 includes at least one microprocessor or microcontroller.

The processor(s) 340 is also capable of executing other processes and programs resident in the memory 360. The processor(s) 340 can move data into or out of the memory 360 as required by an executing process. In some embodiments, the processor(s) 340 is configured to execute the applications 362 based on the OS program 361 or in response to signals received from external devices or an operator. The processor(s) 340 is also coupled to the I/O interface 345, which provides the client device 300 with the ability to connect to other devices such as laptop computers and handheld computers. The I/O interface 345 is the communication path between these accessories and the processor(s) 340.

The processor(s) 340 is also coupled to the touchscreen 350 and the display unit 355. The operator of the client device 300 can use the touchscreen 350 to enter data into the client device 300. The display 355 may be a liquid crystal display or other display capable of rendering text and/or at least limited graphics, such as from web sites.

The memory 360 is coupled to the processor(s) 340. Part of the memory 360 could include a random access memory (RAM), and another part of the memory 360 could include a flash memory or other read-only memory (ROM).

As will be discussed in greater detail below, in this illustrative embodiment, client device 300 receives a signal indicating a shape of a geometric frame and an area of interest in a planar frame. Although FIGS. 2 and 3 illustrate examples of devices in a computing system, various changes may be made to FIGS. 2 and 3. For example, various components in FIGS. 2 and 3 could be combined, further subdivided, or omitted and additional components could be added according to particular needs. As a particular example, the processor(s) 340 could be divided into multiple processors, such as one or more central processing units (CPUs) and one or more graphics processing units (GPUs). Also, while FIG. 3 illustrates the client device 300 configured as a mobile telephone or smartphone, client devices could be configured to operate as other types of mobile or stationary devices. In addition, as with computing and communication networks, client devices and servers can come in a wide variety of configurations, and FIGS. 2 and 3 do not limit this disclosure to any particular client device or server.

Figure 4:
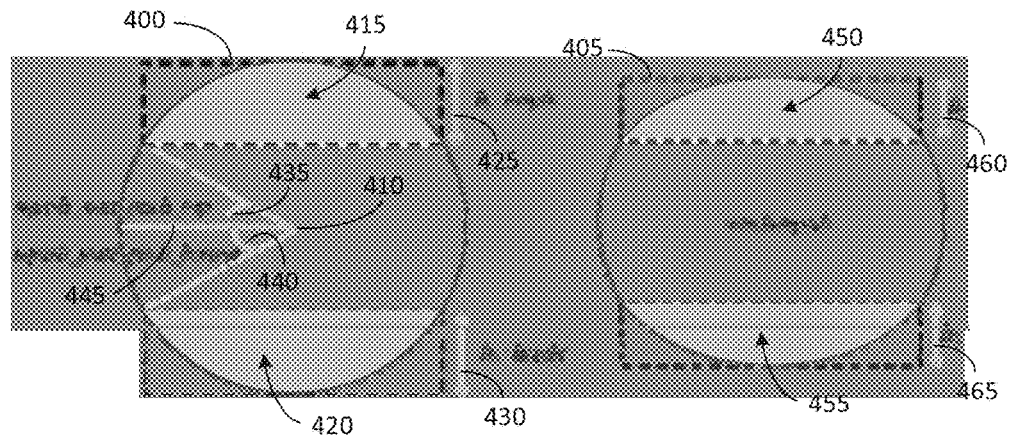
FIG. 4 illustrates an example squished sphere frame according to an embodiment of this disclosure.

FIG. 4 illustrates an example normal spherical frame 400 and a squished spherical frame 405 according to an embodiment of this disclosure. The embodiment of the squished sphere frame 400 for omni media texture mapping metadata shown in FIG. 4 is for illustration only. Other embodiments of the squished sphere frame 400 for omni media texture mapping metadata may be used without departing from the scope of this disclosure.

The spherical frame 400 is defined with a center point 410. The center point 410 represents the point of view of the spherical frame 400. When viewing the spherical frame 400, certain regions have more detail than others. To optimize an equirectangular projection, the regions with less detail are condensed with the equirectangular frame of "squished" in the spherical frame 405.

Some portion comprising a top region 415 and bottom region 420 of spherical frame 400 is squished while other part of sphere is unchanged. As drawn in the figure, the top height 425 of top region 415 in the spherical frame 400 starts at a top angle 435 from the equator 445 indicated by squish_start_pitch_top. The top region 415 is squished into the squished top region 450 to the top squished height 460 by the ratio given by squish_ratio_top, where the value of squish ratio is normalized to 255.

The bottom height 430 of bottom region 420 in the spherical frame 400 starts at a bottom angle 440 from the equator 445 indicated by squish_start_pitch_bottom. The bottom region 420 is squished into the squished bottom region 455 to the bottom squished height 465 by the ratio given by squish_ratio_bottom, where the value of squish ratio is normalized to 255.

Although FIG. 4 illustrates one example of squished sphere frame 400 for omni media texture mapping metadata, various changes may be made to FIG. 4. For example, various components in FIG. 4 may be combined, further subdivided, or omitted and additional components may be added according to particular needs.

Figure 5:
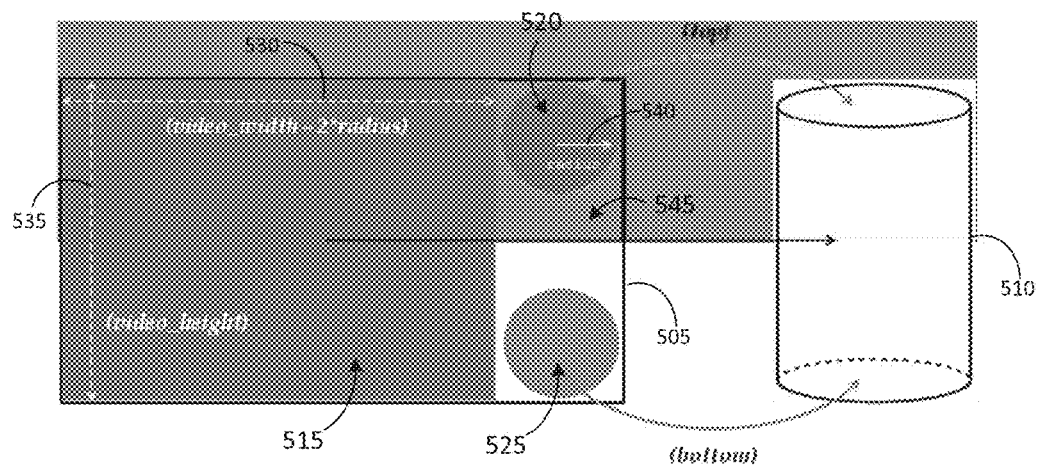
FIG. 5 illustrates an example mapping of a planar frame to a cylindrical frame according to an embodiment of this disclosure.

FIG. 5 illustrates an example mapping 500 of a planar frame 505 to a cylindrical frame 510 according to an embodiment of this disclosure. The embodiment of the example mapping 500 for omni media texture mapping metadata shown in FIG. 5 is for illustration only. Other embodiments of the example mapping 500 for omni media texture mapping metadata may be used without departing from the scope of this disclosure.

A planar frame 505 to be mapped to a cylindrical frame 510 includes a rectangular area 515 on the one side of the planar frame 505 and a top circular area 520 and a bottom circular area 525 on the other side of planar frame 505. The rectangular area 515 is defined by a rectangular width 530 and a rectangular height 535. The top circular area 520 and bottom circular area 525 are defined by a radius 540 that is the value of radius field. The planar frame 505 also includes extra space 545 that is not used for the mapping of the cylindrical frame 510, but could be used for other purposes.

The rectangular area 515 of the planar frame 505 is mapped to the center portion of the cylindrical frame 510 in a manner that a cross section of the width creates a circle. The top circular area 520 of the planar frame 505 is mapped to the top of the cylindrical frame 510 and the bottom circular area 525 of the planar frame 505 is mapped to the bottom of the cylindrical frame 510.

Although FIG. 5 illustrates one example of example mapping 500, various changes may be made to FIG. 5. For example, various components in FIG. 5 may be combined, further subdivided, or omitted and additional components may be added according to particular needs.

Figure 6A:
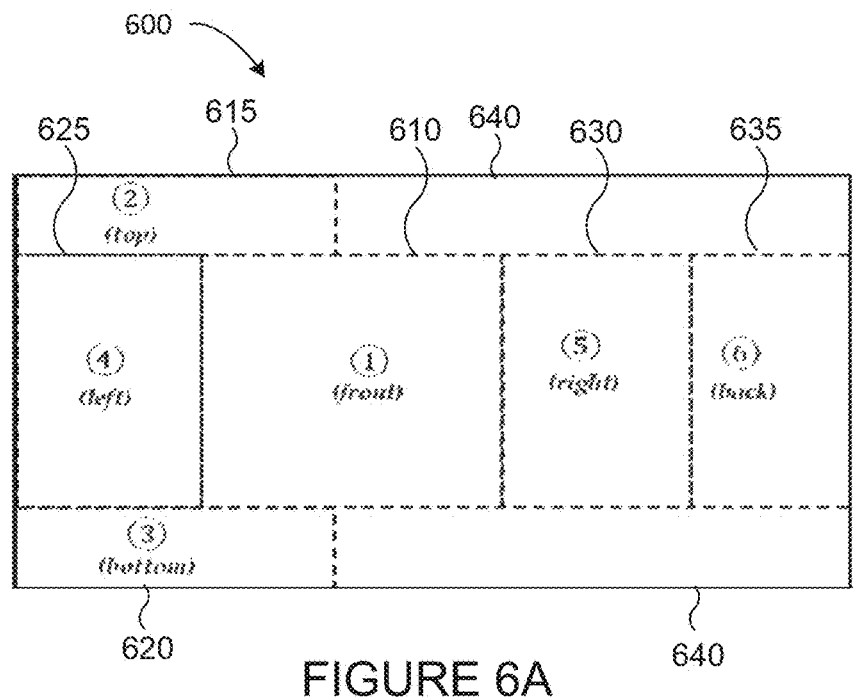
FIGS. 6A and 6B illustrate an example mapping of a planar frame to a cubical frame according to an embodiment of this disclosure.
Figure 6B:
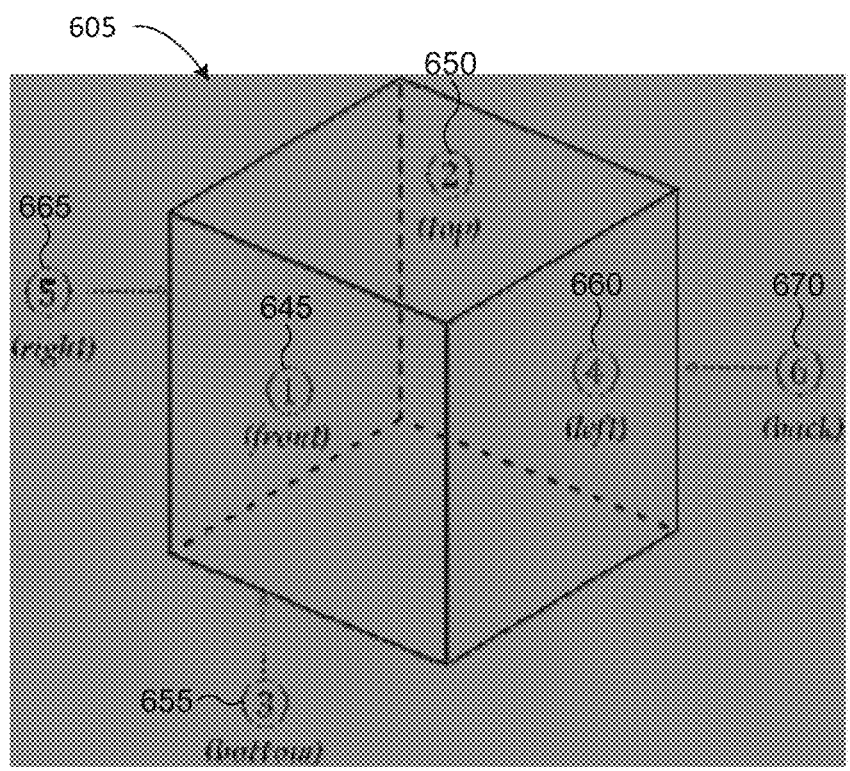

FIGS. 6A and 6B illustrate an example mapping of a planar frame 600 to a cubical frame 605 according to an embodiment of this disclosure. The embodiment of the planar frame 600 and cubical frame 605 for omni media texture mapping metadata shown in FIGS. 6A AND 6B is for illustration only. Other embodiments of the planar frame 600 and cubical frame 605 for omni media texture mapping metadata may be used without departing from the scope of this disclosure.

A planar frame 600 to be mapped to a cubical frame 605 includes six rectangular areas including a front area 610, a top area 615, a bottom area 620, a left area 625, a right area 630 a back area 635 and extra area 640. When mapping the planar frame 600 to a cubical frame 605, the front area 610 is mapped to the front region 645, the top area 615 is mapped to the top region 650, a bottom area 620 is mapped to the bottom region 655, the left area 625 is mapped to the left region 660, the right area 630 is mapped to the right region 665, and the back area 635 is mapped to the back region 670. The extra space 640 is not used for the mapping of the cubical frame 605, but could be used for other purposes. The locations and size of each region of the cubical frame 605 are indicated in an OmniMediaTextureMappingMetadataSampleBox. For example, the OmniMediaTextureMappingMetadataSampleBox could by written as:

```
aligned(8) class OmniMediaTextureMappingMetadataSample( ){
    unsigned int(16)      center_x;
    unsigned int(16)      center_y;
    unsigned int(8)       number_regions;
    for(i=0; i < number_regions ; i++){
        unsigned int(16)      region_top_left_x;
        unsigned int(16)      region_top_left_y;
        unsigned int(16)      region_width;
        unsigned int(16)      region_height;
        if(geometry_type == sphere || squished_sphere){
            int(16) pitch_start;
            int(16) yaw_start;
            int(16) pitch_end;
            int(16) yaw_end;
        }else if(geometry_type == cylinder){
            int(16) yaw_start;
            int(16) yaw_end;
            int(16) height_start;
            int(16) height_end;
        }else if(geometry_type == cube || pyramid){
            unsigned int(16)      surface_id;
            unsigned int(16)      area_top_left_x;
            unsigned int(16)      area_top_left_y;
            unsigned int(16)      area_width;
            unsigned int(16)      area_height;
        }else if(geometry_type == parameterized){
            int(8)  sphere_type;
            int(16) pitch_start;
            int(16) yaw_start;
            int(16) pitch_end;
            int(16) yaw_end;
        }
    }
}
```

The parameters "center_x" and "center_y" indicate, respectively, the horizontal and vertical coordinates of the pixel to be rendered at the center of the geometrical frame. The pixel data at this location of the planar frame in the referenced track is rendered at the point described in the table below according to the type of the geometrical frame. A geometrical frame is a three dimensional frame that corresponds to a specific geometry, such as cubical, cylindrical, pyramidal, etc.

| geometry_type | center position |
| --- | --- |
| 0x00 | Reserved |
| 0x01 | Side-by-side type |
| 0x02 | Top and bottom type |
| 0x03-0xFF | Reserved |

The parameters "number_regions" indicates the number of regions to divide the planar frame in the referenced track. The planar frame in the referenced track is divided into the number of non-overlapping areas as given by the value of this field and each area are separately mapped to the specific regions of the geometrical frame.

The parameters "region_top_left_x" and "region_top_left_y" indicate respectively the horizontal and vertical coordinate of the top-left corner of the area of the planar frame in the referenced track in rectangular frame.

The parameters "region_width" and "region_height" indicate respectively the width and height of an area of the planar frame in the referenced track in a rectangular frame.

The parameters "pitch_start" and "pitch_end" indicate respectively the starting and ending pitch angles of the specific region of the geometrical frame.

The parameters "yaw_start" and "yaw_end" indicate respectively the starting and ending yaw angles of the specific region of the geometrical frame.

The parameters "start_height" and "end_height" indicate respectively the normalized starting and ending height of the specific area of the geometry in cylinder frame.

The parameter "surface_id" indicates the identifier of the region of either cubical frame or pyramidal frame.

The parameter "virtual_sphere_type" indicates the relationship between the 3D geometry to render the planar frame and the spherical frame to represent the 3D regions. A 3D geometry to render 2D video is defined as a list of combination of triangular faces. Each triangular face on a 3D surface defined by three vertices on a 3D surface has one and only one corresponding triangle on a 2D video defined by three 2D texture coordinates.

| virtual_sphere_type | center position |
| --- | --- |
| 0x00 | Reserved |
| 0x01 | Bigger |
| 0x02 | Smaller |
| 0x03-0xFF | Reserved |

Although FIGS. 6A AND 6B illustrates one example of planar frame 600 and cubical frame 605, various changes may be made to FIGS. 6A AND 6B. For example, various components in FIGS. 6A AND 6B may be combined, further subdivided, or omitted and additional components may be added according to particular needs.

Figure 7A:
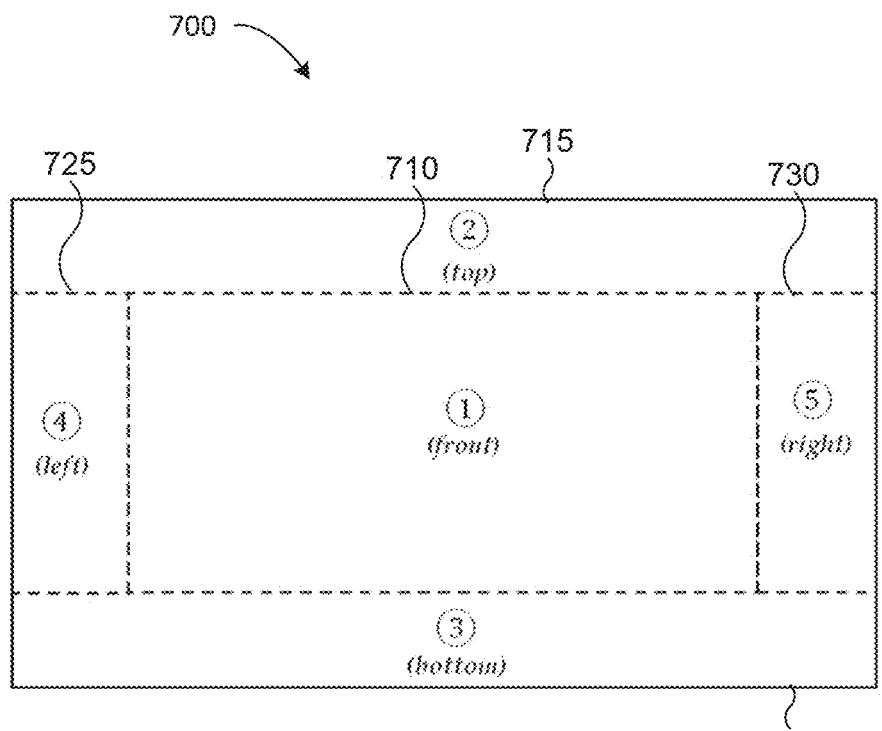
FIGS. 7A and 7B illustrate an example mapping of a planar frame to a pyramidal frame according to an embodiment of this disclosure.
Figure 7B:
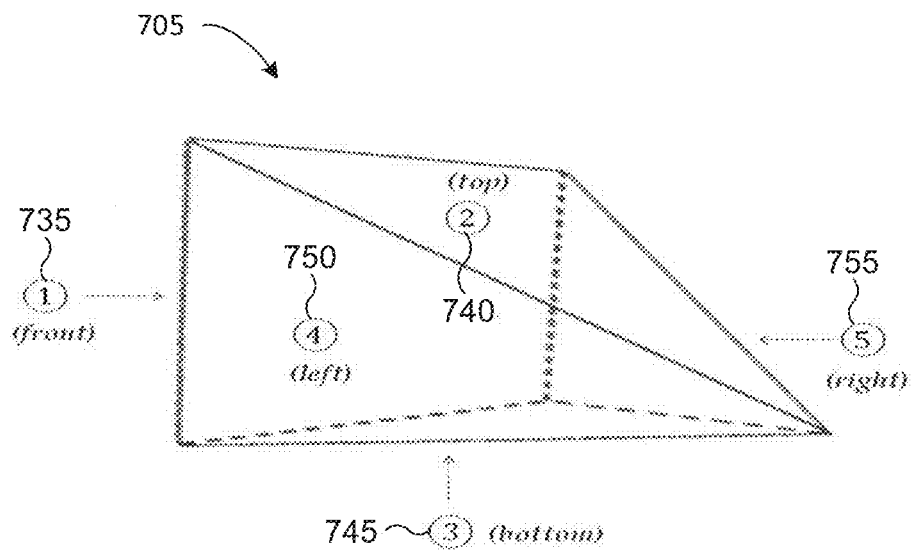

FIGS. 7A and 7B illustrate an example mapping of a planar frame 700 to a pyramidal frame 705 according to an embodiment of this disclosure. The embodiment of the planar frame 700 and pyramidal frame 705 for omni media texture mapping metadata shown in FIGS. 7A AND 7B is for illustration only. Other embodiments of the planar frame 700 and pyramidal frame 705 for omni media texture mapping metadata may be used without departing from the scope of this disclosure.

A planar frame 700 to be mapped to a pyramidal frame 705 includes a number rectangular areas depending on the shape of the front region 735. For example, an octagonal front region 735 includes a total of nine regions, a front region 735 and eight triangular regions from each side of the front region. In the illustrated embodiment, the front region 735 is rectangular and the pyramidal frame 705 has a total of five regions, a front region 735, a top region 740, a bottom region 745, a left region 750, and a right region 755. The planar frame 700 corresponding to the pyramidal frame 705 includes a front area 710, a top area 715, a bottom area 720, a left area 725, a right area 730. When mapping the planar frame 700 to a pyramidal frame 705, the front area 710 is mapped to the front region 735, the top area 715 is mapped to the top region 740, a bottom area 720 is mapped to the bottom region 745, the left area 725 is mapped to the left region 750, the right area 730 is mapped to the right region 755. The location and size of the areas of the planar frame 700 to be mapped to the regions of the pyramidal frame 705 are indicated by the OmniMediaTextureMappingMetadataSample box and are defined in the following table:

| surface_id | top left corner location | width | height |
| --- | --- | --- | --- |
| 2 | (0, 0) | $w_v$ | $(h_v - h_1)/2$ |
| 3 | (0, $(h_v + h_1)/2$) | $w_v$ | $(h_v - h_1)/2$ |
| 4 | (0, $(h_v - h_1)/2$) | $(w_v - w_1)/2$ | $h_1$ |
| 5 | ($(w_v + w_1)/2$, $(h_v - h_1)/2$) | $(w_v - w_1)/2$ | $h_1$ | where the $w_v$ is the width of the planar frame 700, $w_1$ is the width of the front area 715, $h_v$ is the height of the planar frame 700, and $h_1$ is the height of the front area 715.

Although FIGS. 7A AND 7B illustrates one example of planar frame 700 and pyramidal frame 705, various changes may be made to FIGS. 7A AND 7B. For example, various components in FIGS. 7A AND 7B may be combined, further subdivided, or omitted and additional components may be added according to particular needs.

Figure 8:
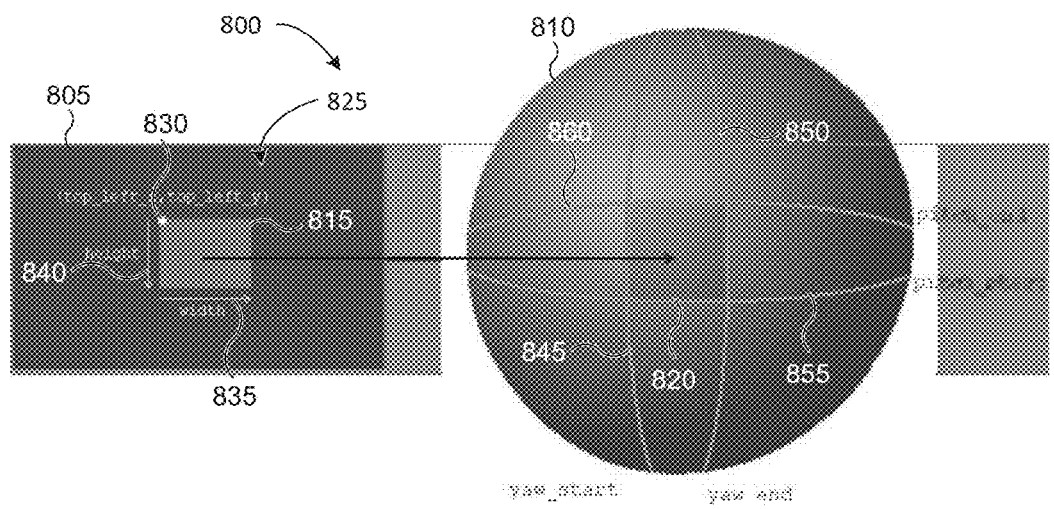
FIG. 8 illustrates an example mapping of an area of a planar frame to a region of a spherical frame according to an embodiment of this disclosure.

FIG. 8 illustrates an example mapping 800 of an area 815 of a planar frame 805 to a region 820 of a spherical frame 810 according to an embodiment of this disclosure. The embodiment of the mapping 800 for omni media texture mapping metadata shown in FIG. 8 is for illustration only. Other embodiments of the mapping 800 for omni media texture mapping metadata may be used without departing from the scope of this disclosure.

The location and dimensions are required for mapping 800 of an area 815 of a planar frame 805 to a region 820 of a spherical frame 810. The area 815 corresponds to a portion of the planar frame 805 that may require more or less definition that the other portion 825 of the planar frame 805. The planar frame 805 can include multiple areas 815, where each area 815 can require more or less definition that other areas 815.

Because the spherical frame 810 is not flat, portions of the area 815 of the planar frame 805 are squished or stretched. For the spherical frame 810 or squished sphere, the area 815 is identified at location point 830 with a width 835 and height 840. The area 815, defined by a portion of the planar frame 805 starting from (top_left_x, top_left_y) and ending at (top_left_x+width, top_left_y+height), is mapped to the region 820 on a spherical frame 810 where the yaw and pitch values of the vertices are between variables "yaw_start" 845 and "yaw_end" 850, and between variables "pitch_start" 855 and "pitch_end" 860, respectively. The "yaw_start" 845 and "yaw_end" 850 identify the sides of the region 820 on the spherical frame 810 and the "pitch_start" 855 and "pitch_end" 860 identify the top and bottom of the region 820 on the spherical frame 810.

Although FIG. 8 illustrates one example of mapping 800, various changes may be made to FIG. 8. For example, various components in FIG. 8 may be combined, further subdivided, or omitted and additional components may be added according to particular needs.

Figure 9:
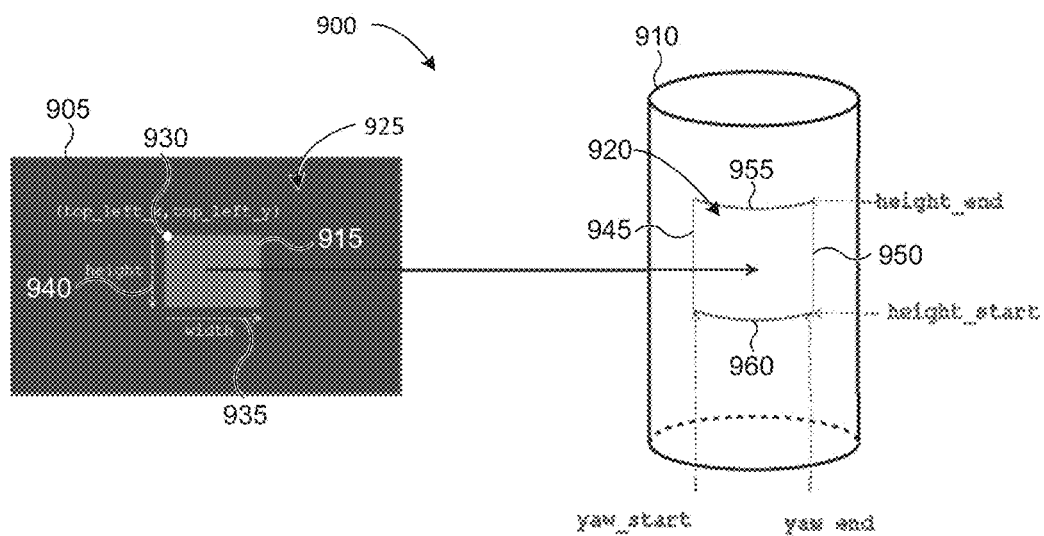
FIG. 9 illustrates an example mapping of an area of a planar frame to a region of a cylindrical frame according to an embodiment of this disclosure.

FIG. 9 illustrates an example mapping 900 of an area 915 of a planar frame 905 to a region 920 of a cylindrical frame 910 according to an embodiment of this disclosure. The embodiment of the mapping 900 for omni media texture mapping metadata shown in FIG. 9 is for illustration only. Other embodiments of the mapping 900 for omni media texture mapping metadata may be used without departing from the scope of this disclosure.

The location and dimensions are required for mapping 900 of an area 915 of a planar frame 905 to a region 920 of a cylindrical frame 910. The area 915 corresponds to a portion of the planar frame 905 that may require more or less definition that the other portion 925 of the planar frame 905.

The planar frame 905 can include multiple areas 915, where each area 915 can require more or less definition that other areas 915.

Because the cylindrical frame 910 is not flat, portions of the area 915 of the planar frame 905 are squished or stretched. For the cylindrical frame 910, the area 915 is identified at location point 930 with a width 935 and height 940. The area 915, defined by a portion of the planar frame 905 starting from (top_left_x, top_left_y) and ending at (top_left_x+width, top_left_y+height), is mapped to the region 920 on a cylindrical frame 910 where the yaw and height values of the vertices are between variables "yaw_start" 945 and "yaw_end" 950, and between variables "height_start" 955 and "height_end" 960, respectively. The "yaw_start" 945 and "yaw_end" 950 identify the sides of the region 920 on the cylindrical frame 910 and the "height_start" 955 and "height_end" 960 identify the top and bottom of the region 920 on the cylindrical frame 910.

Although FIG. 9 illustrates one example of mapping 900, various changes may be made to FIG. 9. For example, various components in FIG. 9 may be combined, further subdivided, or omitted and additional components may be added according to particular needs.

Figure 10:
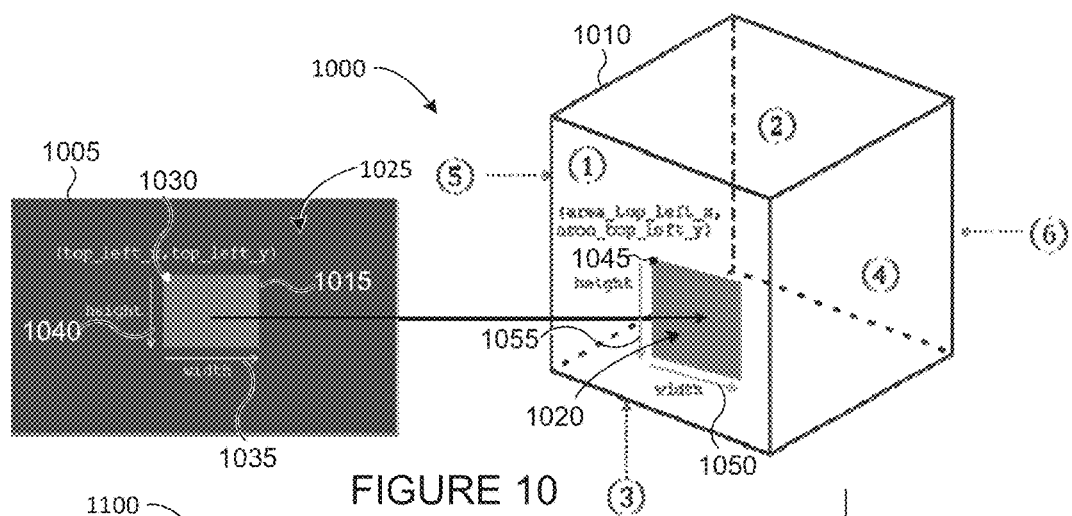
FIG. 10 illustrates an example mapping of an area of a planar frame to a region of a cubical frame according to an embodiment of this disclosure.

FIG. 10 illustrates example mapping 1000 of an area 1015 of a planar frame 1005 to a region 1020 of a cubical frame 1010 according to an embodiment of this disclosure. The embodiment of the mapping 1000 for omni media texture mapping metadata shown in FIG. 10 is for illustration only. Other embodiments of the mapping 1000 for omni media texture mapping metadata may be used without departing from the scope of this disclosure.

The location and dimensions are required for mapping 1000 of an area 1015 of a planar frame 1005 to a region 1020 of a cubical frame 1010. The area 1015 corresponds to a portion of the planar frame 1005 that may require more or less definition that the other portion 1025 of the planar frame 1005. The planar frame 1005 can include multiple areas 1015, where each area 1015 can require more or less definition that other areas 1015.

For the cubical frame 1010, the area 1015 is identified at location point 1030 with a width 1035 and height 1040. The area 1015, defined by a portion of the planar frame 1005 starting from (top_left_x, top_left_y) and ending at (top_left_x+width, top_left_y+height), is mapped to the region 1020 on a cubical frame 1010 where the location point 1045 is defined by the variables (area_top_left_x, area_top_left_y) and ending at (area_top_left_x+area_width, area_top_left_y+area_height). The variables "width" 1050 identifies the sides of the region 1020 on the cubical frame 1010 and the"height" 1055 identifies the top and bottom of the region 1020 on the cubical frame 1010. For a pyramidal frame, the regional mapping is applied to the front surface.

Although FIG. 10 illustrates one example of mapping 1000, various changes may be made to FIG. 10. For example, various components in FIG. 10 may be combined, further subdivided, or omitted and additional components may be added according to particular needs.

Figure 11A:
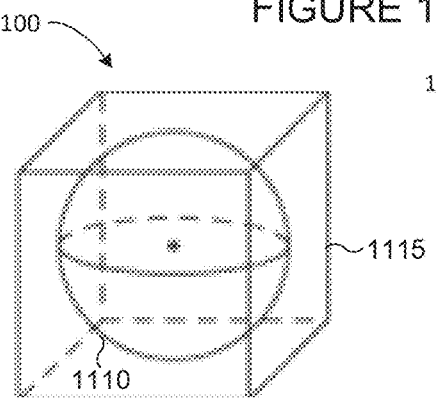
FIGS. 11A and 11B illustrate an example projection of a spherical frame onto a cubical frame surrounding the spherical frame according to an embodiment of this disclosure.
Figure 11B:
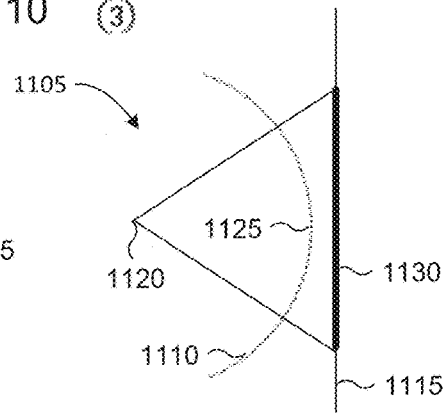

FIGS. 11A and 11B illustrate an example projection 1100 of a spherical frame onto a cubical frame surrounding the spherical frame according to an embodiment of this disclosure. The embodiments of the projection 1100 for omni media texture mapping metadata shown in FIGS. 11A and 11B are for illustration only. Other embodiments of the projection 1100 for omni media texture mapping metadata may be used without departing from the scope of this disclosure. FIG. 11B is a cross section 1105 of the projection 1100 of FIG. 11A. For example, the cubical frame 1115 can take any geometric form, such as pyramidal.

The spherical frame 1110 is located inside the cubical frame 1115 based on a determination of the largest size the spherical frame 1110 can exist touching at least one surface of the cubical frame 1115. At the center of the spherical frame 1110 is a viewpoint 1120 from how a viewer is meant to ingest the video. To determine a region 1130 of a spherical frame 1110 as a region 1130 on the cubical frame 1115, the pixels are mapped based on the viewpoint 1120. A pixel's location on the cubical frame 1115 is determined based on an imaginary straight line from the viewpoint to the cubical frame 1115. The point on the cubical frame 1115 corresponds to the point where the imaginary line crosses the spherical frame 1110.

For the case where the rendering geometry is defined as a list of parameters, the region starting from (top_left_x, top_left_y) and ending at (top_left_x+width, top_left_y+height) is mapped to the area on the rendering geometry corresponding the region on the spherical frame where the yaw and pitch value of vertices of the virtual sphere are between yaw_start and yaw_end, and pitch_start and pitch_end, respectively. The spherical frame is defined as a sphere whose volume is smaller than the rendering geometry the value of the virtual_sphere_type is equal to 0x02. In this case, the spherical frame is the largest sphere fully contained in the rendering geometry. When the value of the virtual_sphere_type is equal to 0x02, the region on the rendering geometry is defined as a region defined by the four points where four lines from the center of the sphere and passes one of the four points on the virtual sphere such as (yaw_start, pitch_start), (yaw_start,pitch_end), (yaw_end, pitch_start), and (yaw_end,pitch_end), respectively and extended until the line intersects the rendering geometry are intersecting.

Although FIGS. 11A and 11B illustrate one example of projection 1100, various changes may be made to FIGS. 11A and 11B. For example, various components in FIGS. 11A and 11B may be combined, further subdivided, or omitted and additional components may be added according to particular needs.

Figure 12A:
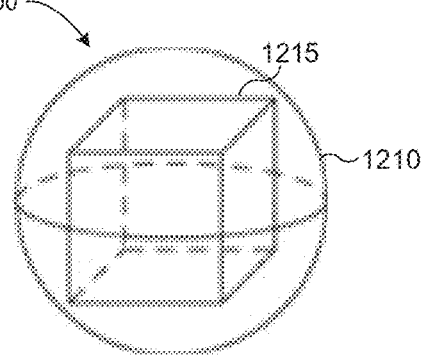
FIGS. 12A and 12B illustrate an example projection of a spherical frame onto a cubical frame surrounded by the spherical frame according to an embodiment of this disclosure.
Figure 12B:
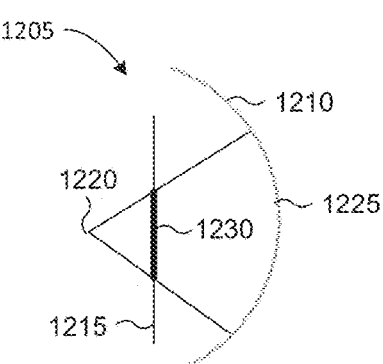

FIGS. 12A and 12B illustrate an example projection 1200 of a spherical frame 1210 onto a cubical frame 1215 surrounded by the spherical frame according to an embodiment of this disclosure. The embodiments of the projection 1200 for omni media texture mapping metadata shown in FIGS. 12A and 12B are for illustration only. Other embodiments of the projection 1200 for omni media texture mapping metadata may be used without departing from the scope of this disclosure. FIG. 12B is a cross section 1205 of the projection 1200 of FIG. 12A. For example, the cubical frame 1215 can take any geometric form, such as pyramidal.

The spherical frame 1210 is located outside the cubical frame 1215 based on a determination of the largest edge located on the cubical frame 1215 in a manner that the spherical frame will contact at the vertices. At the center of the spherical frame 1210 is a viewpoint 1220 from how a viewer is meant to ingest the video. To determine a region 1230 of a spherical frame 1210 as a region 1230 on the cubical frame 1215, the pixels are mapped based on the viewpoint 1220. A pixel's location on the cubical frame 1215 is determined based on an imaginary straight line from the viewpoint to the spherical frame 1215. The point on the cubical frame 1215 corresponds to the point where the imaginary line crosses the cubical frame 1215.

Although FIGS. 12A and 12B illustrate one example of projection 1200, various changes may be made to FIGS. 12A and 12B. For example, various components in FIGS.

12A and 12B may be combined, further subdivided, or omitted and additional components may be added according to particular needs.

For the case where the rendering geometry is defined as a list of parameters, the region starting from (top_left_x, top_left_y) and ending at (top_left_x+width, top_left_y+height) is mapped to the area on the rendering geometry corresponding the region on the spherical frame where the yaw and pitch value of vertices of the virtual sphere are between yaw_start and yaw_end, and pitch_start and pitch_end, respectively. The spherical frame is defined as a sphere whose volume is bigger than the volume of the geometry when the value of the virtual_sphere_type is equal to 0x01. In this case, all vertices of the rendering geometry that have the largest value of the distance from the center of the rendering geometry intersect a point on the spherical frame. When the value of the virtual_sphere_type is equal to 0x01, the region on the rendering geometry is defined as a region defined by the four points where four lines from the center of the sphere to the one of the four points on the virtual sphere such as (yaw_start, pitch_start), (yaw_start, pitch_end), (yaw_end, pitch_start), and (yaw_end,pitch_end), respectively are intersecting.

FIG. 13 illustrates an example process for omni media texture mapping metadata in a video processor according to an embodiment of this disclosure. For example, the process depicted in FIG. 13 may be performed by the video processor in FIG. 2.

In operation 1305, the video processor identifies a shape of a geometric frame for a video. Examples of shapes of geometric frame include spherical frames, squished spherical frames, cylindrical frames, pyramidal frames, cubical frames, etc. The shape can be stored in along with the video in the video processor or the video processor can determine the shape based on the surfaces of the video.

In operation 1310, the video processor identifies a region of interest on the geometric frame. The region of interest is identified as containing an above or below average amount of details. Regions of interest with more details are identified for a higher resolution and regions of interest with less details are identified a lower resolution. The region of interest is located based on geometric parameters.

In operation 1315, the video processor maps the geometric frame to a planar frame with the region of interest from the geometric frame indicated as an area of interest on the planar frame. The area of interest has a different resolution than other portions of the planar frame. The area of interest is located by planar parameters, including a location point, a width, and a height. The planar parameters correspond to the geometric parameters. When the shape is a spherical frame, the geometric parameters are pitch start, pitch end, yaw start and yaw end. When the shape is a cylindrical frame, the geometric parameters include yaw start, yaw end, height start and height end. When the shape is a cubical frame, the geometric parameters include a geometric location point, a geometric width, and a geometric height.

In operation 1320, the video processor generates and transmits a signal indicating the shape and the area of interest to a video player. The signal also includes the resolution of the area of interest and the planar parameters and geometric parameters. Other parameters can include:

The parameter "geometry_type" indicates the type of geometry for rendering of omnidirectional media. Mathematical representation of each geometry type

| Value | geometry_type |
|---|---|
| 0x00 | Reserved |
| 0x01 | Sphere |
| 0x02 | Squished Sphere |
| 0x03 | Cylinder |
| 0x04 | Cube |
| 0x05 | Pyramid |
| 0x06-0x1F | Reserved |

The parameter "projection_type" indicates the method to be used for mapping of texture in the video in the referenced track onto the geometry for rendering of omnidirectional media. Mathematical representation of each projection method for specific geometry type

| Value | projection_type |
|---|---|
| 0x00 | reserved |
| 0x01 | equirectangular projection |
| 0x02-0x07 | reserved |

The parameter "stereoscopic" indicates whether stereoscopic media rendering is used or not. If the value of this field is '1', the video in the referenced track shall be divided into two parts to provide different texture data for left eye and right eye separately according to the composition type specified by stereoscopic_type.

The parameter "multiple_regions" indicates whether video is divided into multiple regions, where each region may have different resolutions or squish factors. If the value of this field '1', the video in the referenced track shall be divided into multiple non-overlapping regions, where each region shall provide texture data for specific area of geometry.

The parameter "entire_volume" indicates whether video covers entire volume of geometry. If the value of this field is '1', entire volume of the geometry is rendered with the video in the referenced track. If the value of this field is '0', texture of some area of the geometry is provided by the mean other than the video in the referenced track.

The parameter "static" indicates whether the texture mapping is changed over time. If the value of this filed is '1', mapping is not changed for duration of entire video in the referenced track. If the value of this filed is '0', mapping is changed over time.

The parameter "static_top" indicates whether the texture data other than video in the referenced track is provided. If the value of this field is '1', the image data to be used as texture for top region of the geometry shall be provided.

The parameter "static_bottom" indicates whether the texture data other than video in the referenced track is provided. If the value of this field is '1', the image data to be used as texture for bottom region of the geometry is provided.

The parameter "radius" indicates the radius of circular shaped area for top and bottom regions of cylindrical frame. The area for the texture of top region is located at the top right corner of the planar frame in circular shape with the radius indicated by this field. The area for the texture of bottom surface is located at the bottom right corner of the video in circular shape with the radius indicated by this field.

The parameter "stereoscopic_type" indicates the type of composition for the stereoscopic video in the referenced track.

| Value | stereoscopic_type |
| --- | --- |
| 0x00 | Reserved |
| 0x01 | Side-by-side type |
| 0x02 | Top and bottom type |
| 0x03-0xFF | Reserved |

The parameters "squish_start_pitch_top" and "squish_start_pitch_bottom" indicate, respectively, the pitch angle of top and the bottom of the spherical frame where the squishing applied. The top and bottom portion of sphere indicated by these fields are squished with the ratio given by the value of the field squish_ratio.

The parameter "squish_ratio" indicates the ratio of squishing for the squished spherical frame.

Although FIG. 13 illustrates an example process for omni media texture mapping metadata in a video processor, respectively, various changes may be made to FIG. 13. For example, while shown as a series of steps, various steps may overlap, occur in parallel, occur in a different order, occur multiple times, or not be performed in certain embodiments.

FIG. 14 illustrates an example process 1400 for omni media texture mapping metadata in a video player according to an embodiment of this disclosure. For example, the process depicted in FIG. 14 may be performed by the video player in FIG. 3.

In operation 1405, the video player receives a signal indicating a shape of a geometric frame for a video and an area of interest on a planar frame. The area of interest has a different resolution than the other portion of the planar frame. The signal can include multiple areas of interest for the planar frame. The area of interest is located by planar parameters including a location point a width and a height.

In operation 1410, the video player maps the area of interest on the planar frame to a region of interest on the geometric frame based on the shape of the geometric frame. The region of interest is located based on geometric parameters corresponding to the planar parameters of the planar frame. When the shape is a spherical frame, the geometric parameters are pitch start, pitch end, yaw start and yaw end. When the shape is a cylindrical frame, the geometric parameters include yaw start, yaw end, height start and height end. When the shape is a cubical frame, the geometric parameters include a geometric location point, a geometric width, and a geometric height.

In operation 1415, the video player generates the geometric frame with the region of interest.

Although FIG. 14 illustrates an example process 1400 for omni media texture mapping metadata in a video player, various changes may be made to FIG. 14. For example, while shown as a series of steps, various steps may overlap, occur in parallel, occur in a different order, occur multiple times, or not be performed in certain embodiments.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A video processor for generating omni media texture mapping metadata, the video processor comprising:
   a memory; and
   a processor operably connected to the memory, the processor configured to:
      identify a shape of a geometric frame for a video;
      identify a region of interest on the geometric frame;
      map the geometric frame to a planar frame with the region of interest from the geometric frame indicated as an area of interest on the planar frame;
      generate a signal indicating the shape and the area of interest; and
      transmit, to a video player, the signal.

2. The video processor of claim 1, wherein:
   the area of interest has a different resolution than other portions of the planar frame; and the signal includes the different resolution for the area of interest.

3. The video processor of claim 1, wherein:
   the area of interest is located by planar parameters on the planar frame, and
   the planar parameters include a location point, a width, and a height.

4. The video processor of claim 3, wherein the region of interest is located based on geometric parameters corresponding to the planar parameters of the planar frame.

5. The video processor of claim 4, wherein, when the shape is a spherical frame, the geometric parameters are pitch start, pitch end, yaw start and yaw end.

6. The video processor of claim 4, wherein, when the shape is a cylindrical frame, the geometric parameters include yaw start, yaw end, height start, and height end.

7. The video processor of claim 4, wherein, when the shape is a cubical frame, the geometric parameters include a geometric location point, a geometric width, and a geometric height.

8. The video processor of claim 4, wherein, when the shape is a parameterized frame, the geometric parameters include a pitch start, a pitch end, yaw start and yaw end, of either a largest sphere fully contained in the parameterized frame or a smallest sphere containing the parameterized frame.

9. A video player for generating omni media texture mapping metadata, the video player comprising:
   a memory; and
   a processor operably connected to the memory, the processor configured to:
      receive, from a video processor, a signal indicating a shape of a geometric frame for a video and an area of interest on a planar frame;
      map the area of interest on the planar frame to a region of interest on the geometric frame based on the shape of the geometric frame; and
      generate the geometric frame with the region of interest.

10. The video player of claim 9, wherein:
    the area of interest has a different resolution than other portions of the planar frame; and the signal includes the different resolution for the area of interest.

11. The video player of claim 9, wherein:
the area of interest is located by planar parameters on the planar frame, and
the planar parameters include a location point, a width, and a height.

12. The video player of claim 11, wherein the region of interest is located based on geometric parameters corresponding to the planar parameters of the planar frame.

13. The video player of claim 12, wherein, when the shape is a spherical frame, the geometric parameters are pitch start, pitch end, yaw start and yaw end.

14. The video player of claim 12, wherein, when the shape is a cylindrical frame, the geometric parameters include yaw start, yaw end, height start, and height end.

15. The video player of claim 12, wherein, when the shape is a cubical frame, the geometric parameters include a geometric location point, a geometric width, and a geometric height.

16. The video player of claim 12, wherein, when the shape is a parameterized frame, the geometric parameters include a pitch start, a pitch end, yaw start and yaw end, of either a largest sphere fully contained in the parameterized frame or a smallest sphere containing the parameterized frame.

17. A method for generating omni media texture mapping metadata in a video player, the method comprising:
receiving, from a video processor, a signal indicating a shape of a geometric frame for a video and an area of interest on a planar frame;
mapping the area of interest on the planar frame to a region of interest on the geometric frame based on the shape of the geometric frame; and
generating the geometric frame with the region of interest.

18. The method of claim 17, wherein:
the area of interest has a different resolution than other portions of the planar frame; and the signal includes the different resolution for the area of interest.

19. The method of claim 17, wherein:
the area of interest is located by planar parameters on the planar frame, and
the planar parameters include a location point, a width, and a height.

20. The method of claim 19, wherein the region of interest is located based on geometric parameters corresponding to the planar parameters of the planar frame.

* * * * *